(12) United States Patent
Viens et al.

(10) Patent No.: US 10,253,417 B2
(45) Date of Patent: Apr. 9, 2019

(54) SYSTEM AND METHOD FOR APPLYING ABRASIVE GRIT

(71) Applicant: UNITED TECHNOLOGIES CORPORATION, Farmington, CT (US)

(72) Inventors: Daniel V. Viens, Mansfield Center, CT (US); Michael Paul Humbert, Wethersfield, CT (US); Joseph V. Mantese, Ellington, CT (US); Raja Kountanya, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/419,705

(22) Filed: Jan. 30, 2017

(65) Prior Publication Data
US 2018/0216237 A1    Aug. 2, 2018

(51) Int. Cl.
| | | |
|---|---|---|
| *B05D 3/00* | (2006.01) |
| *C08J 7/18* | (2006.01) |
| *G21H 5/00* | (2006.01) |
| *C23C 24/10* | (2006.01) |
| *F01D 5/14* | (2006.01) |
| *B23K 13/01* | (2006.01) |
| *B23K 26/34* | (2014.01) |
| *C23C 26/00* | (2006.01) |

(52) U.S. Cl.
CPC .............. *C23C 24/10* (2013.01); *B23K 13/01* (2013.01); *B23K 26/34* (2013.01); *C23C 26/00* (2013.01); *F01D 5/147* (2013.01); *F05D 2220/32* (2013.01); *F05D 2230/30* (2013.01); *F05D 2240/303* (2013.01); *F05D 2240/305* (2013.01)

(58) Field of Classification Search
CPC ........ C23C 24/10; C23C 24/103; C23C 26/02
See application file for complete search history.

(56) References Cited

U.S. PATENT DOCUMENTS

| 4,488,882 A | * | 12/1984 | Dausinger ............ B23K 31/025 |
| | | | 264/101 |
| 4,951,888 A | * | 8/1990 | Sharpe ................... D21D 1/306 |
| | | | 219/137 R |
| 5,437,724 A | | 8/1995 | Dansereau et al. |
| 5,453,329 A | * | 9/1995 | Everett ................. C23C 24/103 |
| | | | 219/121.66 |

(Continued)

FOREIGN PATENT DOCUMENTS

| EP | 0573928 A1 | 12/1993 |
| GB | 2475850 A | 6/2011 |
| WO | 2015128140 A1 | 9/2015 |

OTHER PUBLICATIONS

European Search Report dated Mar. 5, 2018, issued in the corresponding European Patent Application 18154049.3.

*Primary Examiner* — Michael P Wieczorek
(74) *Attorney, Agent, or Firm* — Bachman & LaPointe, P.C.

(57) ABSTRACT

A method for forming an abrasive surface includes utilizing an energy source to form a melt pool layer in a substrate and applying abrasive grit into the melt pool layer. A method for forming an abrasive surface including applying an abrasive grit to a substrate and utilizing an energy source to form a melt pool layer in the substrate without disturbing the abrasive grit such that the abrasive grit becomes embedded in the melt pool layer.

22 Claims, 6 Drawing Sheets

(56) References Cited

U.S. PATENT DOCUMENTS

| | | | |
|---|---|---|---|
| 5,486,281 A | | 1/1996 | Gruver et al. |
| 5,607,561 A | | 3/1997 | Gruver et al. |
| 5,665,217 A | | 9/1997 | Gruver et al. |
| 5,702,288 A | | 12/1997 | Liebke et al. |
| 5,702,574 A | | 12/1997 | Foster et al. |
| 5,792,267 A | | 8/1998 | Marszal et al. |
| 5,834,689 A | | 11/1998 | Cook |
| 5,902,471 A | | 5/1999 | Jordan et al. |
| 5,961,807 A | | 10/1999 | Daum et al. |
| 5,997,248 A | * | 12/1999 | Ghasripoor ............ F01D 11/12 415/173.4 |
| 6,162,335 A | | 12/2000 | Jordan et al. |
| 6,355,086 B2 | | 3/2002 | Brown et al. |
| 6,526,327 B2 | * | 2/2003 | Kar ...................... B22F 3/1055 219/121.6 |
| 8,266,801 B2 | * | 9/2012 | Clark ........................ B22F 7/04 29/889.7 |
| 8,353,259 B2 | | 1/2013 | Strock et al. |
| 8,790,078 B2 | | 7/2014 | Zajchowski et al. |
| 8,821,988 B2 | * | 9/2014 | Gokhale .................. C09D 5/00 427/543 |
| 9,057,272 B2 | | 6/2015 | Cheah |
| 9,550,267 B2 | | 1/2017 | Beckman et al. |
| 2016/0368096 A1 | | 12/2016 | Peuser et al. |

* cited by examiner

SYSTEM AND METHOD FOR APPLYING ABRASIVE GRIT

BACKGROUND

The present disclosure relates to a method and apparatus for applying abrasive grit, and more specifically to a method and apparatus for applying abrasive grit to gas turbine airfoils.

The efficiency of gas turbines is largely dependent on the effective sealing between the rotating components and the stationary components. One such location is between the radial end of the rotating airfoils and the outside walls of the compressor and the turbine sections. Tight clearances are highly desirable; however perturbations to the system caused by thermal growth of the components, foreign object ingestion, maneuvering of the aircraft, and others can cause an interference condition between the rotating and non-rotating parts.

One strategy to increase the robustness of the tight tolerance between the airfoil and the seal is to increase the wear resistance of the airfoil and decrease the wear resistance of the seal. Consequently, when the conditions exist for interference, the seal material is preferentially removed and the damage is locally limited.

One common approach for increasing the wear resistance of the airfoil is to attach abrasives to the airfoil tip. This effectively creates a "grinding" action that efficiently removes the seal material when there is interference. An electroplating process to attach abrasive grit requires application of a mask where plating is to be avoided. The mask is subsequently removed after the sequence of steps in the electroplating process is completed which is a relatively time consuming and costly process.

Although effective, the electroplating process to attach cubic Boron Nitride (cBN) abrasives is relatively slow, capital intensive, and requires multiple operations including time consuming masking.

SUMMARY

A method for forming an abrasive surface according to one disclosed non-limiting embodiment of the present disclosure can include utilizing an energy source to form a melt pool in a substrate; and applying an abrasive grit into the melt pool.

A further embodiment of the present disclosure may include that the abrasive grit includes cubic boron nitride (cBN).

A further embodiment of the present disclosure may include that the energy source includes a laser.

A further embodiment of the present disclosure may include that the energy source includes magnetic induction.

A further embodiment of the present disclosure may include that the melt pool is between about 20 to 200 μm in depth.

A further embodiment of the present disclosure may include that the substrate is an airfoil.

A further embodiment of the present disclosure may include that the substrate is a tip of the airfoil.

A further embodiment of the present disclosure may include that applying the abrasive grit includes varying a concentration of the abrasive grit.

A further embodiment of the present disclosure may include that applying the abrasive grit includes varying a type of abrasive grit.

A further embodiment of the present disclosure may include that applying the abrasive grit includes applying the abrasive grit in a predetermined pattern.

A method for forming an abrasive surface according to one disclosed non-limiting embodiment of the present disclosure can include applying an abrasive grit to a substrate; and utilizing an energy source to form a melt pool in the substrate without disturbing the abrasive grit such that the abrasive grit becomes embedded in the melt pool.

A further embodiment of the present disclosure may include that the abrasive grit includes cubic boron nitride (cBN).

A further embodiment of the present disclosure may include that the energy source includes a laser.

A further embodiment of the present disclosure may include that the energy source includes magnetic induction.

A further embodiment of the present disclosure may include that the melt pool is between about 20 to 200 μm.

A further embodiment of the present disclosure may include that the substrate is an airfoil.

A further embodiment of the present disclosure may include that the substrate is a tip of the airfoil.

A further embodiment of the present disclosure may include that applying the abrasive grit includes varying a concentration of the abrasive grit.

A further embodiment of the present disclosure may include that applying the abrasive grit includes varying a type of abrasive grit.

A further embodiment of the present disclosure may include that applying the abrasive grit includes applying the abrasive grit in a predetermined pattern via a computer aided manufacturing system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
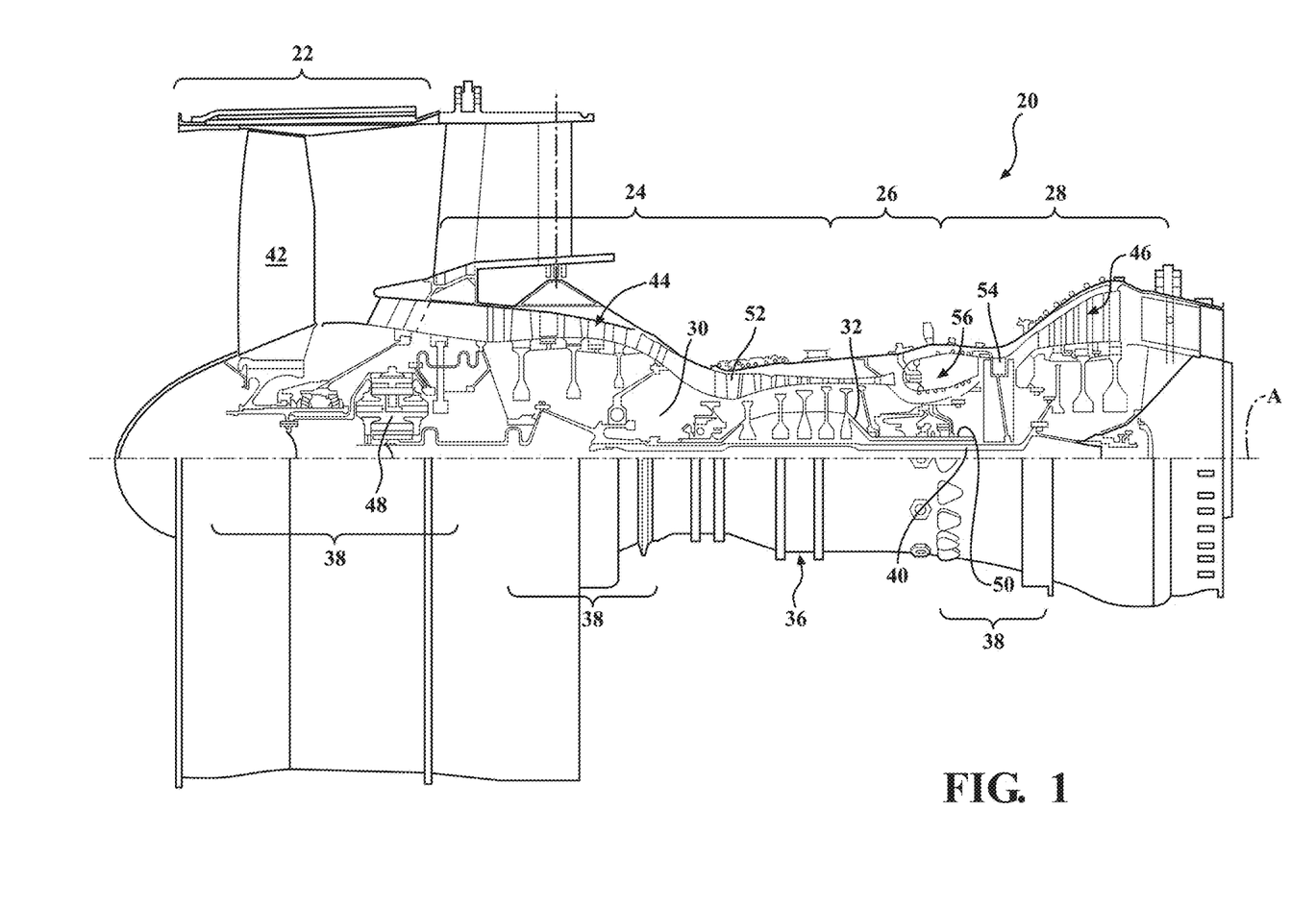
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor (LPC) 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor (HPC) 52 and high pressure turbine (HPT) 54. A combustor 56 is arranged between the HPC 52 and the HPT 54. The inner shaft 40 and the outer shaft 50 are concentric and rotate about the engine central longitudinal axis A.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. Various bearing structures 38 at various locations may alternatively or additionally be provided.

Figure 2:
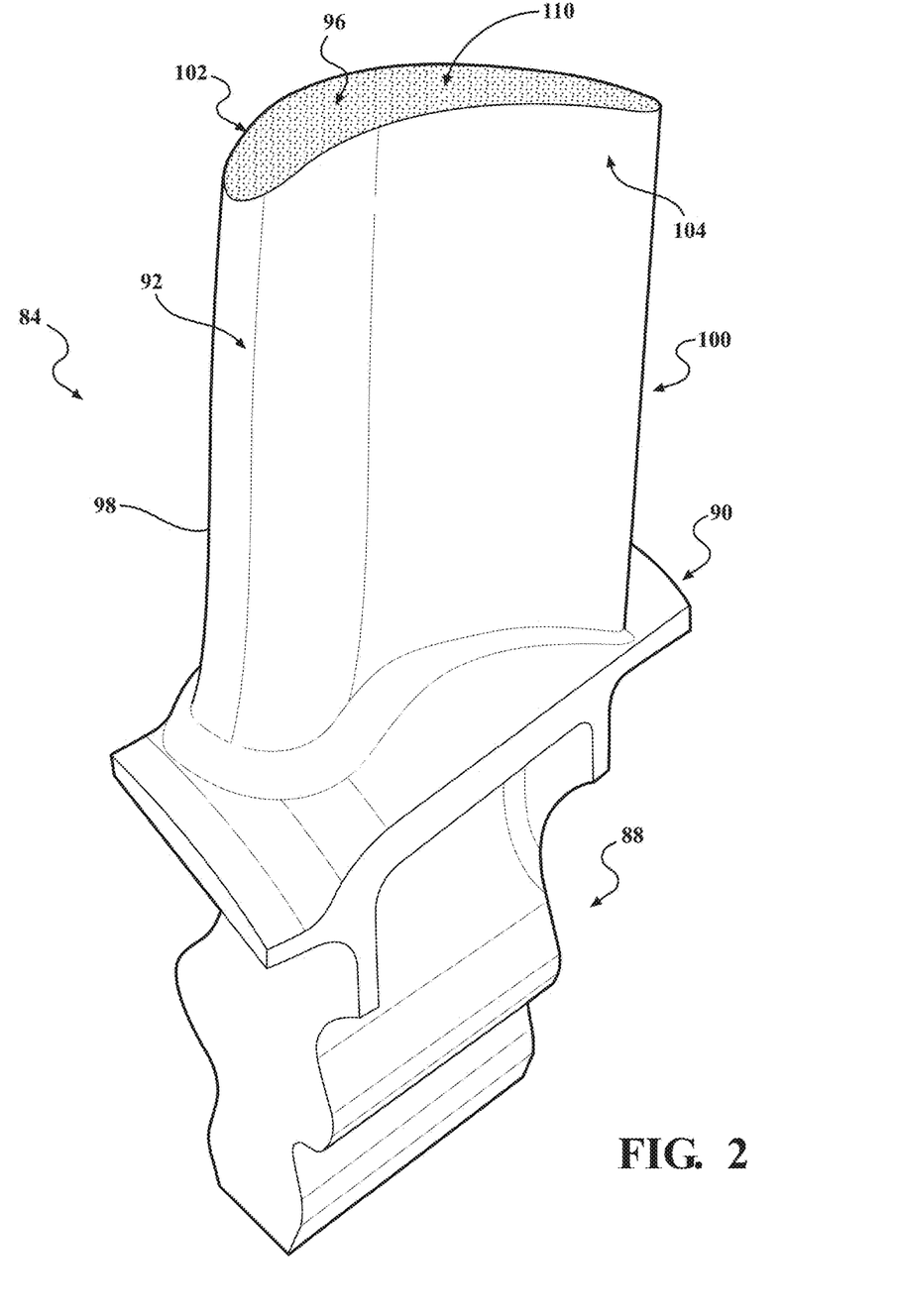
FIG. 2 is a perspective view of an airfoil as an example airfoil component.

With reference to FIG. 2, a blade 84 for use in the cold section, e.g., compressor, or the hot section, e.g., the turbine generally includes a root 88, a platform 90, and an airfoil 92 which extends outward to a tip 96. The platform 90 separates a gas path side inclusive of the airfoil 92 and a non-gas path side inclusive of the root 88. The platform 90 generally separates the root 88 and the airfoil 92 to define an inner boundary of a gas path. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Figure 3:
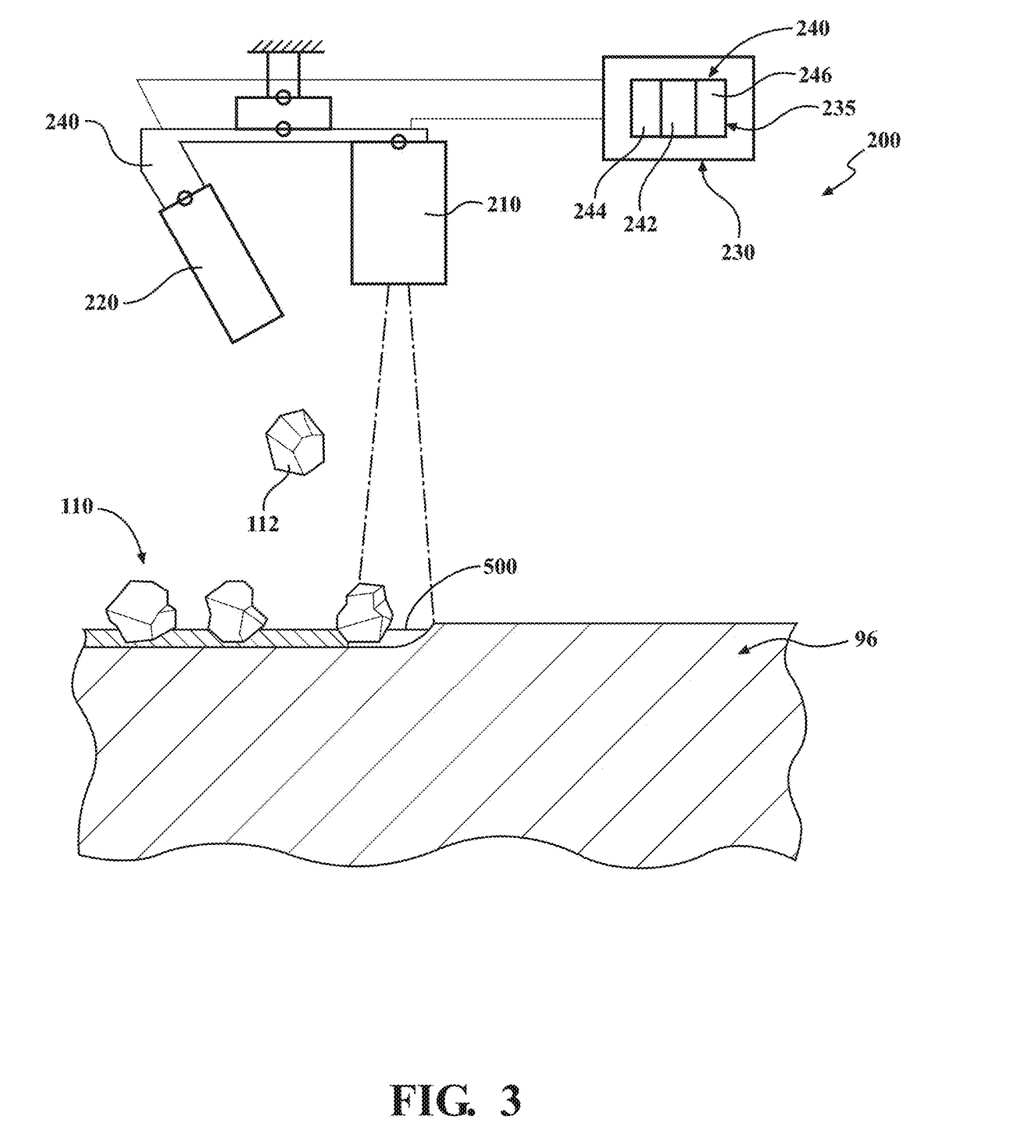
FIG. 3 is a schematic view of a system for applying abrasive grit according to one disclosed non-limiting embodiment.

With reference to FIG. 3, one non-limiting embodiment of a system 200 for applying an abrasive surface 110 to the tip 96 is disclosed. The system 200 is herein directed to tipping blades and may include the appropriate abrasive surface 110 that may have a compositions based on, for example, whether the airfoil is used in the cold section, e.g., compressor, or the hot section, e.g., the turbine.

The system 200 generally includes an energy source 210, a powder applicator 220 and a control 230 (all illustrated schematically). It should be appreciated that various components and subsystems may be additionally or alternatively provided.

Figure 4A:
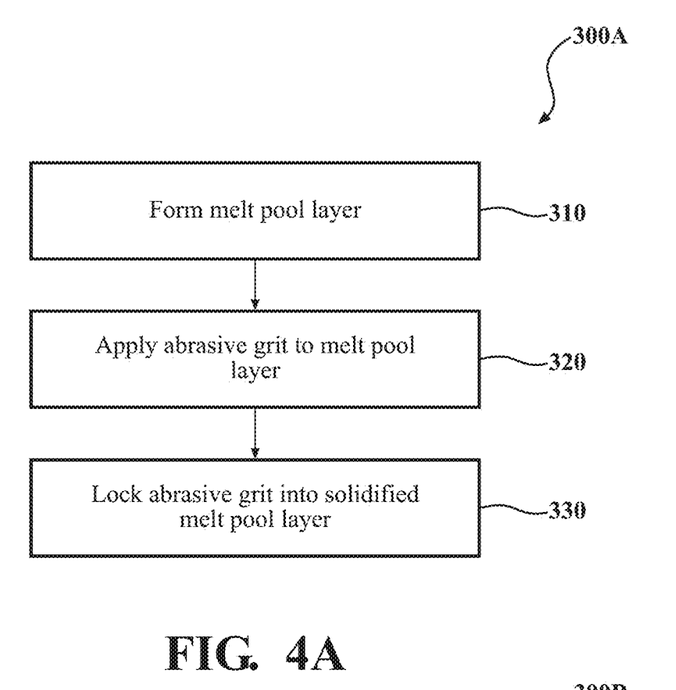
FIG. 4A is a flow chart of a method for applying abrasive grit according to one disclosed non-limiting embodiment.
Figure 4B:
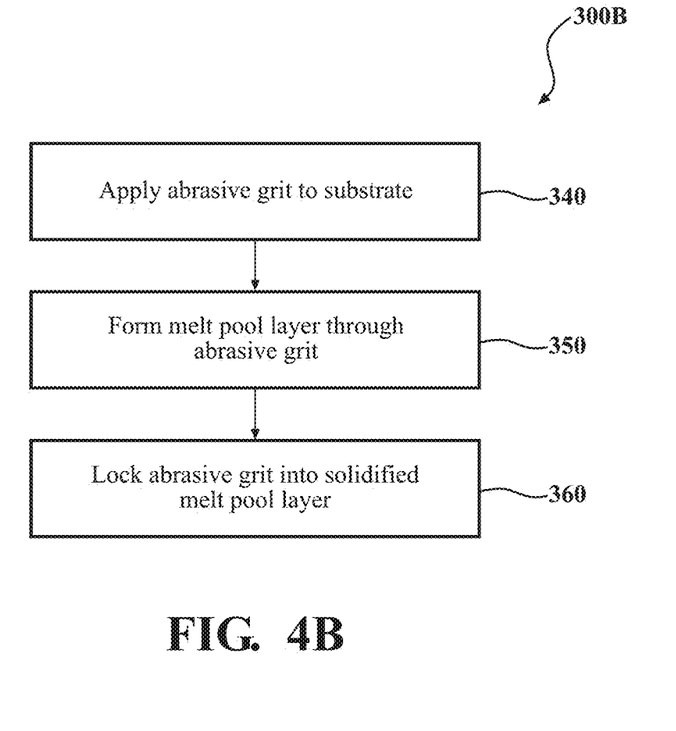
FIG. 4B is a flow chart of a method for applying abrasive grit according to one disclosed non-limiting embodiment.

The control 230 generally includes a control module 240 with a processor 242, a memory 344, and an interface 346. The processor 342 may be any type of microprocessor having desired performance characteristics. The memory 244 may include any type of computer readable medium, which stores the data and control algorithms described herein such as in method 300 (FIG. 4). The steps of method 300 are schematically disclosed in terms of functional block diagrams as a flowchart. It should be appreciated that alternative or additional steps may be provided without departing from the teaching herein.

The functions of the method 300 are disclosed in terms of functional block diagrams, which represent these functions, may be enacted in either dedicated hardware circuitry or programmed software routines capable of execution in a microprocessor based electronics control embodiment. Other operational software for the processor 242 may also be stored in the memory 244 to provide both manual and automatic Programmable Logic Controller (PLC) inputs. The interface 246 facilitates communication with other subsystems. It should be appreciated that the control 230 may be centralized or distributed. It should also be appreciated that various control inputs may be alternatively or additionally provided.

The energy source 210 can, in one embodiment, be spatially focused to provide an intense (point) energy source that can be precisely controlled relative to focal length, lateral position, relative velocity and intensity such as, for example, a laser and/or magnetic induction system utilizing flux concentrators. Additionally, a pulsed laser can be used to enable better control of the resulting microstructure of the airfoil tip 96. In an additional embodiment, a diffuse oscillating magnetic field or a relatively low power laser with a large spot size may be utilized to slow the cooling rate after melting the surface. The energy source 210 may be readily adapted from an additive manufacturing system that precisely controls the energy source 210. That is, the system 200 may utilize an additive manufacturing process that includes but are not limited to, Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Laser Powder Bed Fusion (LPBF) and others. Although particular additive manufacturing processes are disclosed, other suitable rapid manufacturing methods can alternatively be used.

The powder applicator 220 is operable to dispense abrasive grit 112 to form the abrasive surface 110. In the cold section, for example, the abrasive grit 112 may include cubic boron nitride (cBN), quartz, ceramics, alumina, silicon carbide, diamond, tungsten carbide, alloyed diamond/cBN, silicon nitride, and combinations thereof can also be embedded as the abrasive grit materials. It should also be appreciated that application is not limited to aerospace components and various other workpieces for various grinding and/or polishing applications will benefit herefrom.

The energy source 210 and the powder applicator 220 may be controlled by the control 230 via a computer aided manufacturing system 240 (e.g., a 5-axis machine using CAM technologies), which permits application of the abrasive grit 112 to complex and relatively inaccessible surfaces. That is, the system 240 is operable to accurately position the energy source 210 and the powder applicator 220 either simultaneously or independently.

With reference to FIG. 4A, one non-limiting embodiment of a method 300 for applying the abrasive surface 110 initially includes utilizing the energy source 210 to melt a thin (20 to 200 µm) melt pool 500 (FIG. 3) of the airfoil tip 96 (step 310). Next, or concurrently, the powder applicator 220 applies the abrasive grit 112 into the melt pool 500 (step 320). The abrasive grit 112 may be applied by, for example, directly injecting the abrasive grit 112 into the melt pool using the powder applicator 220 or by spreading the abrasive particles on the airfoil tip 96 using an additive manufacturing type powder bed. That is, alternatively, the abrasive grit 112 may be predisposed on the substrate and the energy source 210 is passed therethrough as the abrasive grit 112 does not obscure the energy source 210 (FIG. 4B). The methods minimize pre and post processing. Additionally, there is flexibility to couple laser irradiation and induction heating as desired to produce a desired surface structure.

The melt pool 500 then solidifies and locks the abrasive grit 112 into place (step 330). The melt pool 500 is thus of a thickness generally less than the grit size of the abrasive grit 112 such that the abrasive grit 112 extends above the solidified melt pool 500. Induction energy may beneficially not interfere with the abrasive grit 112 (which is non-conducting and non-magnetic), which prevents degradation of the grit and leads to a more uniform temperature distribution within the airfoil tip 96. The depth of the melt pool layer 500 can be precisely controlled by, for example, the intensity, the traverse speed, frequency of the applied RF, height of the coil above the metal surface, and the traverse pattern. Further, preheating or post-heating can further control the time-temperature history. Thus, melt pool solidification and residual stresses can be controlled to ensure the requisite microstructure and properties so that defects such as cracks are minimized or avoided.

In another embodiment, material is added onto the tipped surface to increase the bond with the abrasive grit 112 (step 340). For example, if the melt pool is 10 microns deep and the grit particle size is 200 microns, the abrasive grit 112 may be only relatively weakly tacked onto the substrate and the bond strength may not be sufficient. Next, additional metal powder is added onto the substrate around the abrasive grit 112 and then melted in place to improve bonding of the abrasive grit 112 to improve residual stress states in the blade tip.

Figure 5:
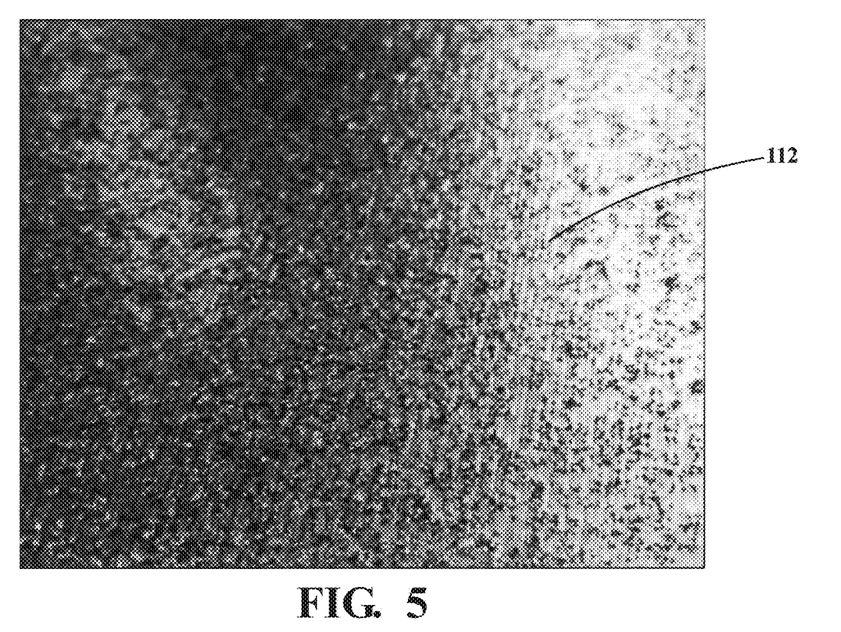
FIG. 5 is a micrograph of a laser-embedded cBN with a first concentration according to one embodiment.
Figure 6:
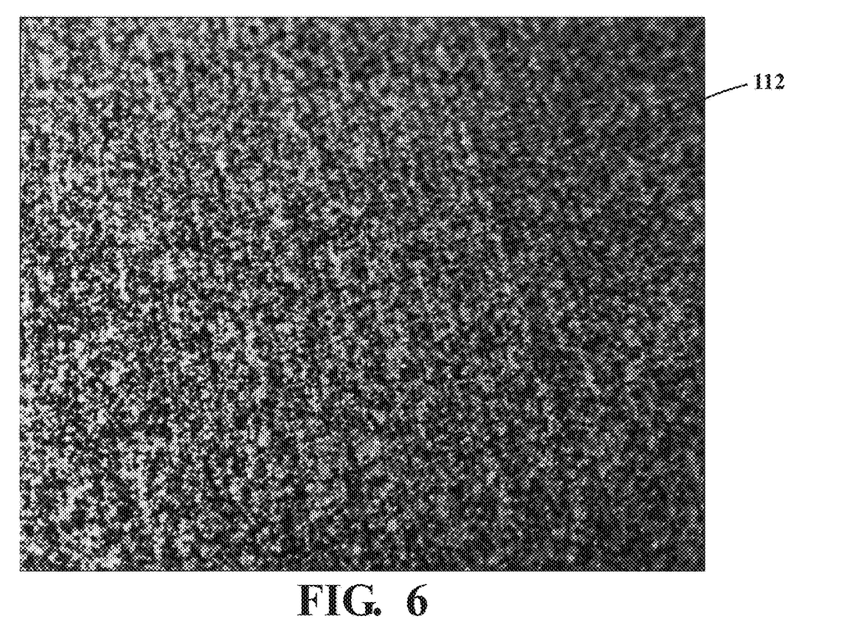
FIG. 6 is a micrograph of a laser-embedded cBN with a second concentration according to one embodiment greater than the concentration of FIG. 5.

The method 300 can also control the concentration, and the size distribution of the abrasive grit 112 embedded into the substrate (FIGS. 5 and 6). FIG. 5 illustrates a grit concentration less than the grit concentration illustrated in FIG. 6. In one embodiment, 10-70% surface coverage of the abrasive grit 112 is provided and more specifically, about 30-50% surface coverage. For example, an extremely dense concentration on the order of 70 grits per $mm^2$, which equates to 100 micron cBN centered approximately every 120 microns. Another example of the grit concentration is less than about 40 grits/$mm^2$ and greater than about 10 grits/$mm^2$.

Additionally, the size of the abrasive grit 112 can be varied from about 10 µm up to about 200 µm, and more specifically 120 µm up to about 160 µm. That is, the type and size of the abrasive grit 112 can be applied in a varied manner upon the substrate. An appropriate grit/unit area will be dependent on the particle size. For example, for 200 micron particles, 10 grit/$mm^2$ is reasonable, but 50 µm particles would require a higher grit density of approximately 150 grits/$mm^2$ for a reasonable coverage.

Figure 7:
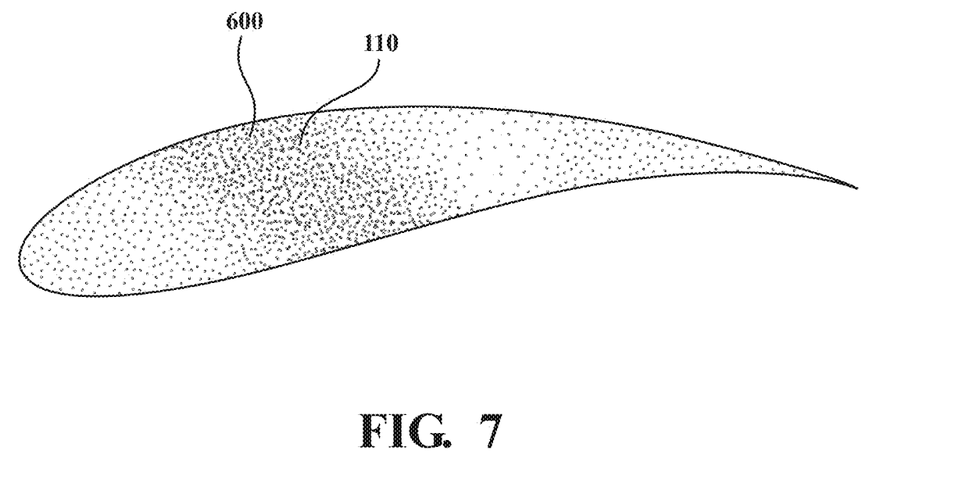
FIG. 7 is a schematic representation of the abrasive grit applied in a predetermined pattern according to one embodiment.

Furthermore, the high fidelity of the energy source 210, permits the abrasive grit 112 to be applied in a predetermined pattern 600 (FIG. 7) where, for example, some areas of the tip 96 include different concentration of the grit 112. The predetermined pattern 600 includes changing the concentration in a predetermined manner. One embodiment includes a higher concentration around the perimeter of the airfoil tip 96 compared with the concentration at the center of the airfoil tip 96. The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

The invention claimed is:

1. A method for forming an abrasive surface, comprising:
    utilizing an energy source to form a melt pool into a substrate; and
    applying an abrasive grit into the melt pool, the melt pool of a thickness less than the grit size of the abrasive grit.

2. The method as recited in claim 1, wherein the abrasive grit includes cubic boron nitride (cBN).

3. The method as recited in claim 1, wherein the energy source includes a laser.

4. The method as recited in claim 1, wherein the energy source includes magnetic induction.

5. The method as recited in claim 1, wherein the melt pool is 20 to 200 µm in depth.

6. The method as recited in claim 1, wherein the substrate is an airfoil.

7. The method as recited in claim 6, wherein the substrate is a tip of the airfoil.

8. The method as recited in claim 1, wherein applying the abrasive grit includes varying a concentration of the abrasive grit.

9. The method as recited in claim 1, wherein applying the abrasive grit includes varying a type of abrasive grit.

10. The method as recited in claim 1, wherein applying the abrasive grit includes applying the abrasive grit in a predetermined pattern.

11. The method as recited in claim 1, wherein abrasive grit becomes partially embedded in the melt pool.

12. The method as recited in claim 1, further comprising:
adding metal powder onto the substrate around the abrasive grit; and
melting the metal powder in place to increase retention of the abrasive grit such that the abrasive grit extends to form the abrasive surface.

13. A method for forming an abrasive surface, comprising:
applying an abrasive grit to a substrate; and
utilizing an energy source to form a melt pool in the substrate without disturbing the abrasive grit as the abrasive grit does not obscure the energy source such that the abrasive grit becomes partially embedded in the melt pool to form the abrasive surface, the melt pool of a thickness less than the grit size of the abrasive grit.

14. The method as recited in claim 13, wherein the abrasive grit includes cubic boron nitride (cBN).

15. The method as recited in claim 13, wherein the energy source includes a laser.

16. The method as recited in claim 13, wherein the energy source includes magnetic induction.

17. The method as recited in claim 13, wherein the melt pool is between about 20 to 200 μm in depth.

18. The method as recited in claim 13, wherein the substrate is an airfoil.

19. The method as recited in claim 18, wherein the substrate is a tip of the airfoil.

20. The method as recited in claim 13, wherein applying the abrasive grit includes varying a concentration of the abrasive grit.

21. The method as recited in claim 13, wherein applying the abrasive grit includes varying a type of abrasive grit.

22. The method as recited in claim 13, wherein applying the abrasive grit includes applying the abrasive grit in a predetermined pattern via a computer aided manufacturing system.

* * * * *